(12) United States Patent
Benetti

(10) Patent No.: US 11,702,334 B2
(45) Date of Patent: Jul. 18, 2023

(54) CUSHIONING MAT

(71) Applicant: AMAHORSE TRADING S.R.L., Perugia (IT)

(72) Inventor: Mauro Benetti, Perugia (IT)

(73) Assignee: AMAHORSE TRADING S.R.L., San Giustino (IT)

( * ) Notice: Subject to any disclaimer, the term of this patent is extended or adjusted under 35 U.S.C. 154(b) by 647 days.

(21) Appl. No.: 16/481,671

(22) PCT Filed: Feb. 2, 2018

(86) PCT No.: PCT/IB2018/050669
§ 371 (c)(1),
(2) Date: Jul. 29, 2019

(87) PCT Pub. No.: WO2018/142340
PCT Pub. Date: Aug. 9, 2018

(65) Prior Publication Data
US 2019/0382255 A1    Dec. 19, 2019

(30) Foreign Application Priority Data

Feb. 3, 2017   (IT) .................. 102017000012036

(51) Int. Cl.
| | |
|---|---|
| *B68C 1/12* | (2006.01) |
| *B29D 99/00* | (2010.01) |
| *B29K 101/12* | (2006.01) |
| *B29K 105/00* | (2006.01) |

(52) U.S. Cl.
CPC ............ *B68C 1/12* (2013.01); *B29D 99/0092* (2013.01); *B29K 2101/12* (2013.01); *B29K 2105/0061* (2013.01)

(58) Field of Classification Search
CPC .......... A47C 27/142; B29K 2105/0061; B29K 2101/12; B29D 99/0092; B68C 2001/123; B68C 1/12; B68C 1/08
See application file for complete search history.

(56) References Cited

U.S. PATENT DOCUMENTS

| | | | | | |
|---|---|---|---|---|---|
| 3,870,450 | A | * | 3/1975 | Graebe | ............... A61G 7/05769 425/269 |
| 4,541,136 | A | * | 9/1985 | Graebe | ................ A47C 27/081 5/655.3 |

(Continued)

FOREIGN PATENT DOCUMENTS

| | | | | |
|---|---|---|---|---|
| GB | 2352957 A | * | 2/2001 | ............... B68C 1/12 |
| WO | 0050336 A1 | | 8/2000 | |
| WO | 2008100728 A2 | | 8/2008 | |

*Primary Examiner* — Peter M Poon
*Assistant Examiner* — Carly W. Lynch
(74) *Attorney, Agent, or Firm* — ArentFox Schiff LLP; Michael Fainberg

(57) ABSTRACT

A cushioning mat comprises a plurality of cushioning bumps arranged in a plurality of rows, the bumps of each row alternating with substantially flat bottom portions. Each bump comprises a top wall and a side wall which extends from a mat base identified by the bottom portions. The top wall and the side wall define an inner bump cavity. The bumps of adjacent rows are staggered with each other. In at least a portion of the side wall a vent opening is made which places in communication the inner cavity of the bump with the outside of the bump.

13 Claims, 5 Drawing Sheets

(56) References Cited

U.S. PATENT DOCUMENTS

| | | | | |
|---|---|---|---|---|
| 5,459,896 A | * | 10/1995 | Raburn | A61G 7/05707 |
| | | | | 5/653 |
| 5,829,081 A | * | 11/1998 | Pearce | A47C 27/083 |
| | | | | 5/654 |
| 6,413,458 B1 | * | 7/2002 | Pearce | B29C 48/11 |
| | | | | 264/141 |
| 9,706,851 B2 | * | 7/2017 | Malkiewicz | A47C 27/144 |
| 9,789,018 B2 | * | 10/2017 | Anderson | A47C 7/021 |
| 10,545,349 B1 | * | 1/2020 | Sullivan | B29C 43/52 |
| 2015/0040524 A1 | | 2/2015 | Benetti | |

* cited by examiner

CUSHIONING MAT

CROSS-REFERENCE TO RELATED APPLICATIONS

This application is the U.S. National Stage Application of International Patent Application No. PCT/IB2018/050669, filed on Feb. 2, 2018, which claims priority to Italian Patent Application No. 102017000012036, filed on Feb. 3, 2017, the contents of each of which is incorporated herein by reference in its entirety.

The present invention relates to a cushioning mat of the type made of a thermoplastic material, in particular for making seats or other support structures, for example saddle pads for horse riding.

BACKGROUND OF THE INVENTION

Cushioning mats of a thermoplastic gel are already known, also for making saddle pads for horse riding.

These mats must guarantee a high level of comfort for the user and, in the case of saddle pads for horse riding, also for the animal. In addition to the cushioning effect, a "breathable" effect is also required, i.e. an air circulation preferably both above and below the mat.

SUMMARY OF THE INVENTION

The object of the present invention is to provide a cushioning mat, particularly for seats and saddle pads for horse riding, particularly effective both in terms of cushioning effect and in terms of air circulation, therefore particularly comfortable.

Said object is achieved with a cushioning mat according to claim 1 and with a saddle pad according to claim 14. The dependent claims describe preferred embodiments of the invention.

The features and the advantages of the cushioning mat according to the invention shall be made readily apparent from the following description of preferred embodiments thereof, provided purely by way of a non-limiting example, with reference to the accompanying figures, in which:

DETAILED DESCRIPTION

Figure 1:
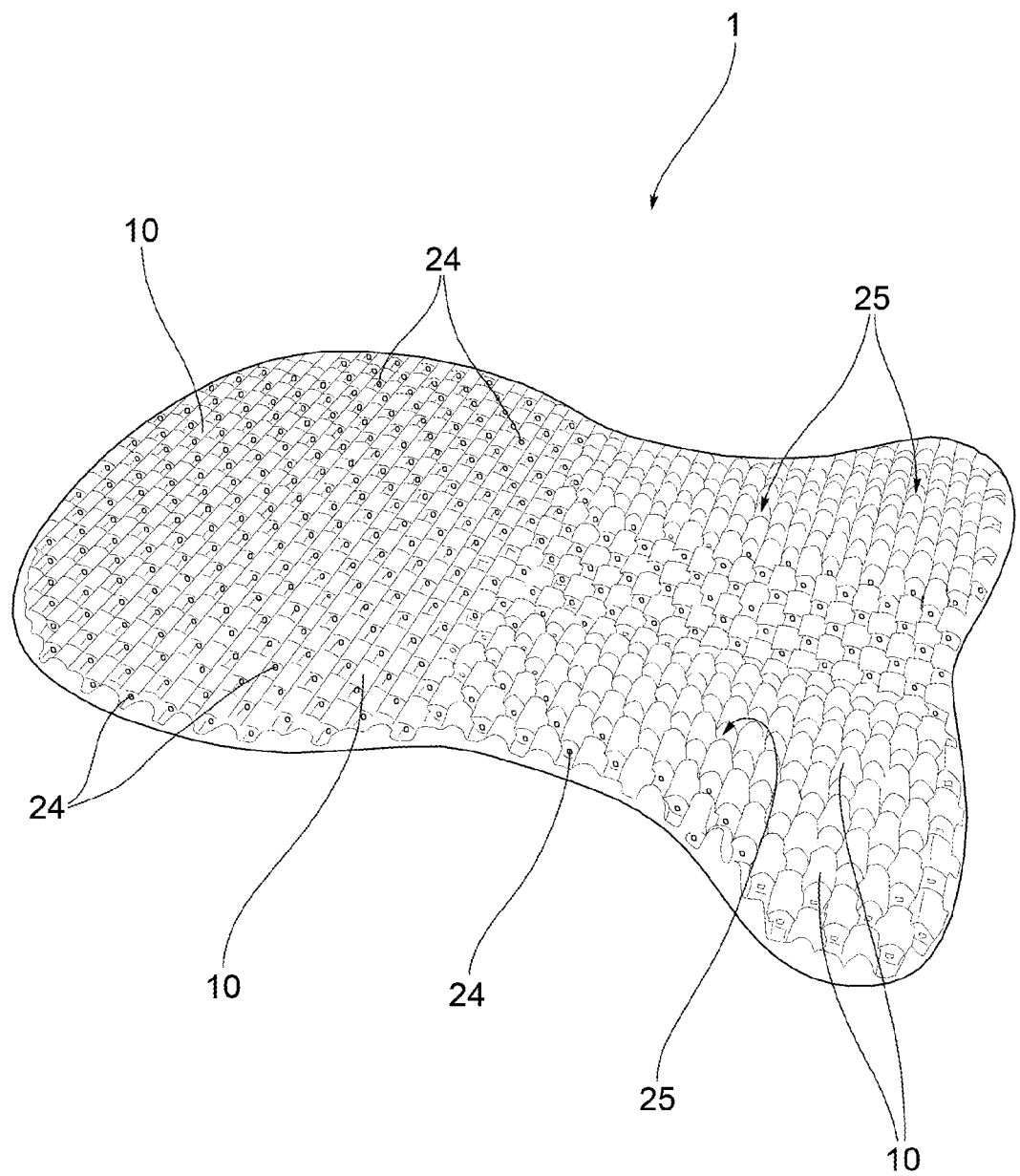
FIG. 1 is a perspective view of a mat according to the invention configured so as to make a saddle pad for horse riding.

In said drawings, reference numeral 1 indicates a cushioning mat according to the invention as a whole. The mat is configured so as to make a saddle pad for horse riding.

However, the saddle pad must be considered only as an example of practical embodiment of the invention. It is clear that the cushioning and breathable structure that will be described below can be used in many applications, for example for seat cushions for wheelchairs for the disabled, cushions for motor vehicle seats, saddles for cycles and motorcycles, anti-decubitus mattresses, shoe soles, etc.

The cushioning mat 1 is made of a thermoplastic material, for example a thermoplastic gel, by injection moulding or by casting, for example in the case of a silicone material.

The type of material used must guarantee, according to the intended use, the correct elastic deformation of the mat, i.e. its yield when subjected to the weight force of the user and its ability to return to the initial position in the absence of such weight.

The mat 1 comprises a plurality of cushioning bumps 10 arranged along a plurality of rows 12. The bumps 10 of each row 12 alternate with substantially flat bottom portions 14.

Preferably, as will be described in greater detail below, the rows 12 are adjacent to each other. In other words, the cushioning mat 1, at least in its cushioning portions, consists exclusively of the alternation of cushioning bumps 10 and bottom portions 14.

Moreover, in plan view, the dimensions of the cushioning bumps 10 and of the bottom portions 14 are comparable, although if it is preferable, in order to provide a uniform and comfortable support surface for the user, that the area occupied by the bumps 10 is larger than the area occupied by the bottom portions 14.

With respect to the dimensions of the mat 1, the cushioning bumps 10 and the bottom portions 14 are much smaller, so that in a row 12 there are numerous bumps 10 and bottom portions 14.

Each bump 10 comprises a top wall 16 and a side wall 18 which extends from a mat base identified by the bottom portions 12.

The top wall 16 side wall 18 define an inner bump cavity 20. Therefore, each bump 10 does not have a closed base, but is open on the opposite side with respect to the top wall 16.

In other words, observing the mat 1 from below, or from the support side on a supporting surface (in the case of a saddle pad, the horse's back), the lower sides of the bottom portions 14 can be seen alternating with the inner cavities 20 of the bumps 10.

Adjacent rows 12 are staggered with each other. In other words, the bumps 10 and the bottom portions 14 are arranged in a chessboard pattern in the mat 1.

As stated above, the top walls 16 of the bumps 10 form a yielding support surface for a user.

In one embodiment, the bumps 10 have side 18 and top 16 walls of substantially constant thickness.

Furthermore, in one embodiment, the average height of the inner bump cavity 20 is larger than the thickness of the top wall 16. In this way, a certain axial excursion of the top wall 16 is guaranteed, when subjected to the weight force of the user, before this top wall, following the crushing of the bump 10, comes into contact with the support surface of the mat. 1.

Moreover, in one embodiment, the transverse extension of the inner bump cavity 20 is greater than the thickness of the side wall. In other words, the inner cavity 20 forms an empty area under the top wall 16, which allows the latter to bend axially and with a maximum excursion in its centre.

In at least a portion of the side wall 18 a vent opening 24 is made which places in communication the inner cavity 20 of the bump with the outside of the bump.

In particular, the vent opening 24 leads into a vent chamber 25 inferiorly delimited by the bottom portion 14 and laterally by the side walls 18 of the bumps 10 adjacent the bottom portion 14.

In a preferred embodiment, each vent chamber 25 is completely open upward, i.e. on the side opposite the bottom portion 14 which inferiorly delimits it.

The formation of the vent opening 24 in the side wall 18, rather than in the top wall 16 as in some embodiments of the prior art, allows better air circulation, since the vent opening 24 is not occluded by the presence of the user or of another element placed on the cushioning mat.

Furthermore, the air outgoing from the inner cavity is free to vent into the vent chamber 25 above the bottom portions 14.

It should also be noted that each bump 10 of the cushioning mat 1 communicates with at least one vent chamber 25 through the vent opening 24. Therefore, from the point of view of air circulation, the bumps 10 are independent of each other.

In other words, the air pumping action which is exerted by a load which bears on a bump 10 and the consequent venting of the air contained in the respective inner cavity 20, downwards and in the at least one vent chamber 25 adjacent to the bump 10, occur individually and independently of the presence of the other bumps 10 of the mat.

Therefore, advantageously, the cushioning and air circulation actions carried out by the mat in reaction to a load can also take place locally, so as to maximize the beneficial effects thereof without necessarily extending to other areas of the mat not subjected to compression.

In one embodiment, the vent opening 24 is made astride or near the connecting edge 22 of each bump 10 with at least one of the 4 adjacent bottom portions 14.

When such a vent opening 24 is made straddling the connecting edge 22, part of the vent opening 24 is formed in the side wall 18 of the bump 10 and part is formed in the bottom portion 14.

In one embodiment, both the portion of the vent opening 24 formed in the side wall 18 and the portion formed in the bottom portion 14 are through.

In an embodiment variant, the portion of the vent opening 24 formed in the bottom portion 14 is formed in the thickness of the bottom portion 14 without being through.

When the vent opening 24 is formed in the vicinity of the connecting edge 22, this vent opening 24 is through and is formed in a lower portion of the side wall 18.

Figure 2:
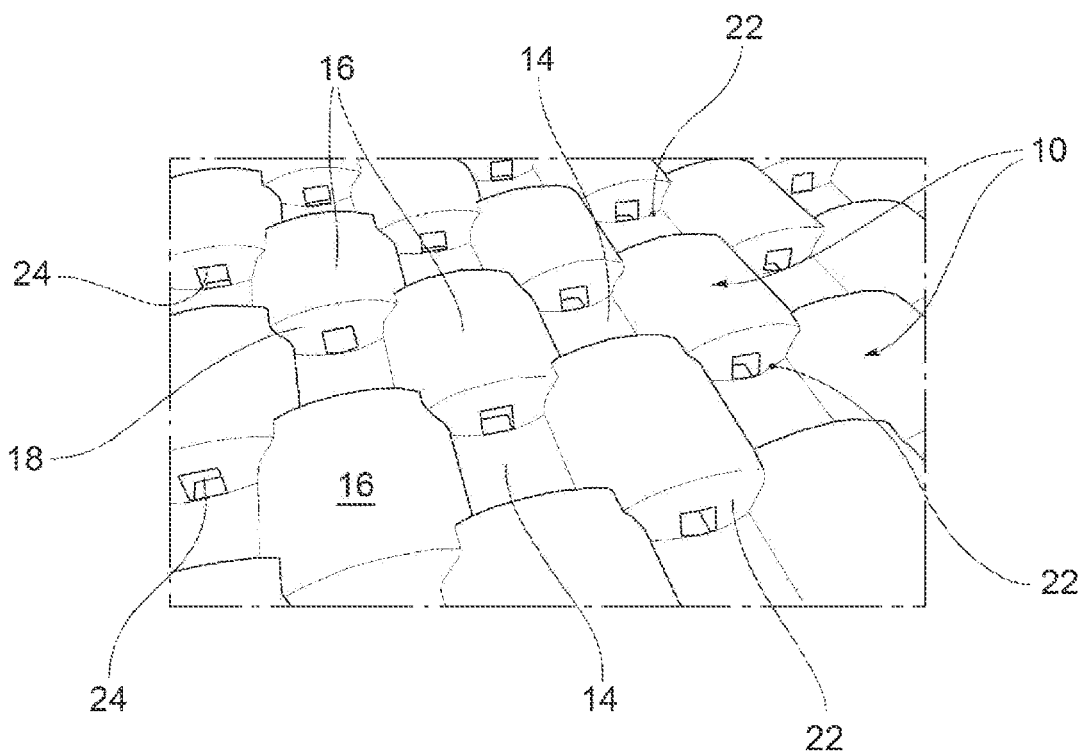
FIG. 2 is an enlarged view of a portion of the mat.
Figure 2A:
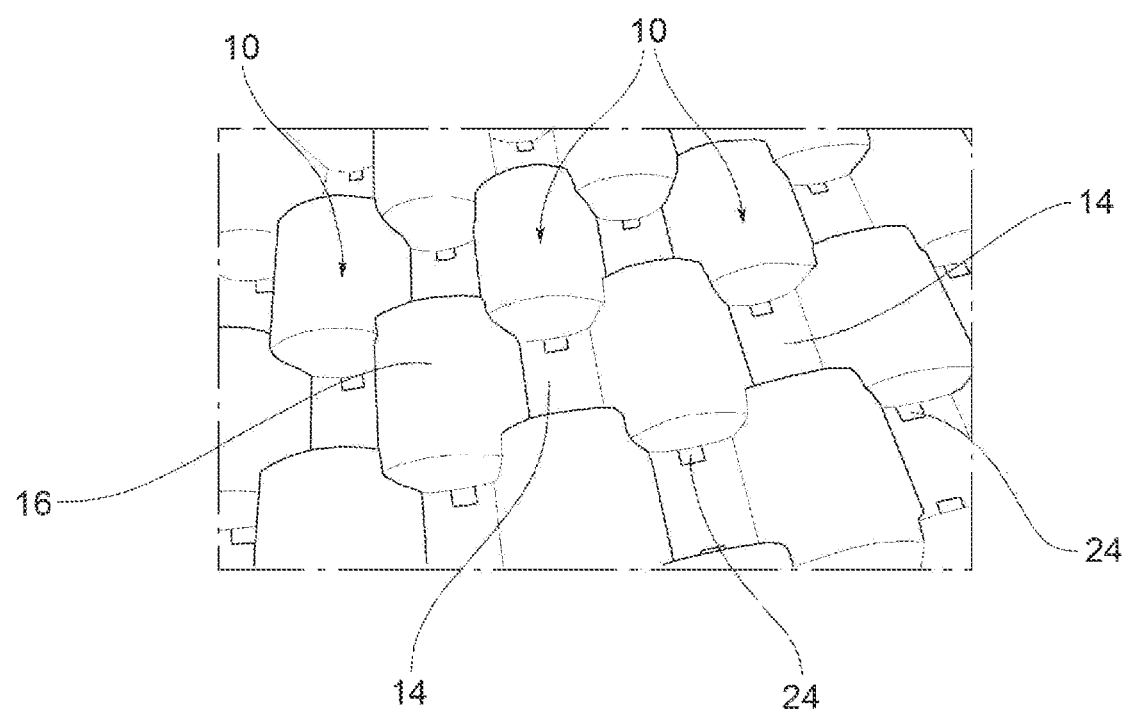
FIG. 2a is an enlarged view similar to the previous one, but in an embodiment of the mat having a different arrangement of the vent openings.

In an embodiment shown in FIG. 2a, the vent opening 24 is formed in the side wall portion 18 which extends below the upper surface of the bottom portion 14.

In both cases, the positioning of the vent opening 24 is such that, when the bump 10 is compressed by the weight of the user, and then crushes downwards, the vent opening 24 still remains sufficiently open to let the air of the inner cavity 20, compressed by the crushing of the bump 10, flow out from the inside to the outside of said inner cavity 20.

In this way, a circulation of air is created both on the upper side and under the mat 1, which favours the comfort of the user (and of the animal, in the case of a saddle pad), and at the same time prevents the creation of a "windy effect", i.e. that a depression is created inside the bump 1 which prevents it from returning to the starting position, i.e. not crushed.

In one embodiment, each bump 10 is connected to the nearest bumps of adjacent rows by means of respective portions of side wall 18.

In this way, the cushioning effect is more effective because, since the bumps are connected to one another laterally, and thus subjected to a constraint in the transversal direction, their deformation is predominantly axial.

In one embodiment, at least some of the cushioning bumps 10, and in particular those subjected to greater pressure, have the top wall 16 substantially flat or, even more preferably, convex. In this way, the whole top wall 16 is opposed to the weight force of the user and, in the case of a convex wall, the axial excursion which the wall must perform before touching the support surface is even greater.

In one embodiment, at least some of the cushioning bumps 10 have a substantially rectangular cross section. This geometry favours, inter alia, the chessboard arrangement of the bumps 10 and of the bottom portions 14.

In this embodiment, the adjacent bumps are connected to each other at the corners of the side wall 18.

In one embodiment, the edges delimiting the vent openings 24 are spaced from the connection areas between the bumps 10 of adjacent rows. In other words, the vent openings 24 do not extend across the entire width of the respective side wall 18, but are formed in a limited and central portion of this side wall 18. In this way, the calibrated width of the air passage gap favours the correct resistance to the crushing of the bumps and furthermore the presence of the vent openings 24 does not unduly weaken the side wall 18.

In one embodiment, the bumps 10 of adjacent rows 12 are at least partially superposed with each other at least along vertical planes which the vent openings 24 lie on.

Figure 3:
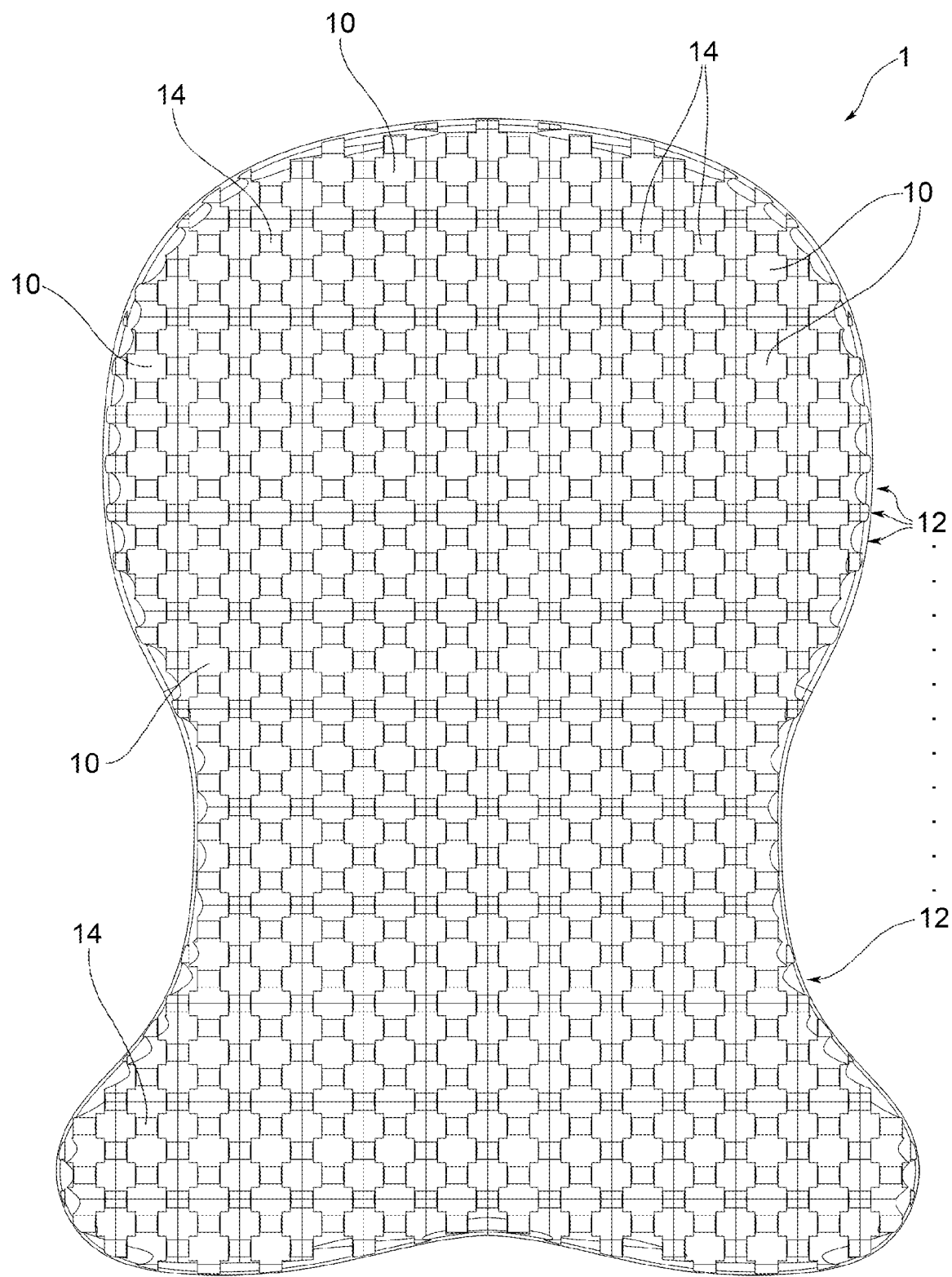
FIG. 3 is a plan top view of the mat.
Figure 4:
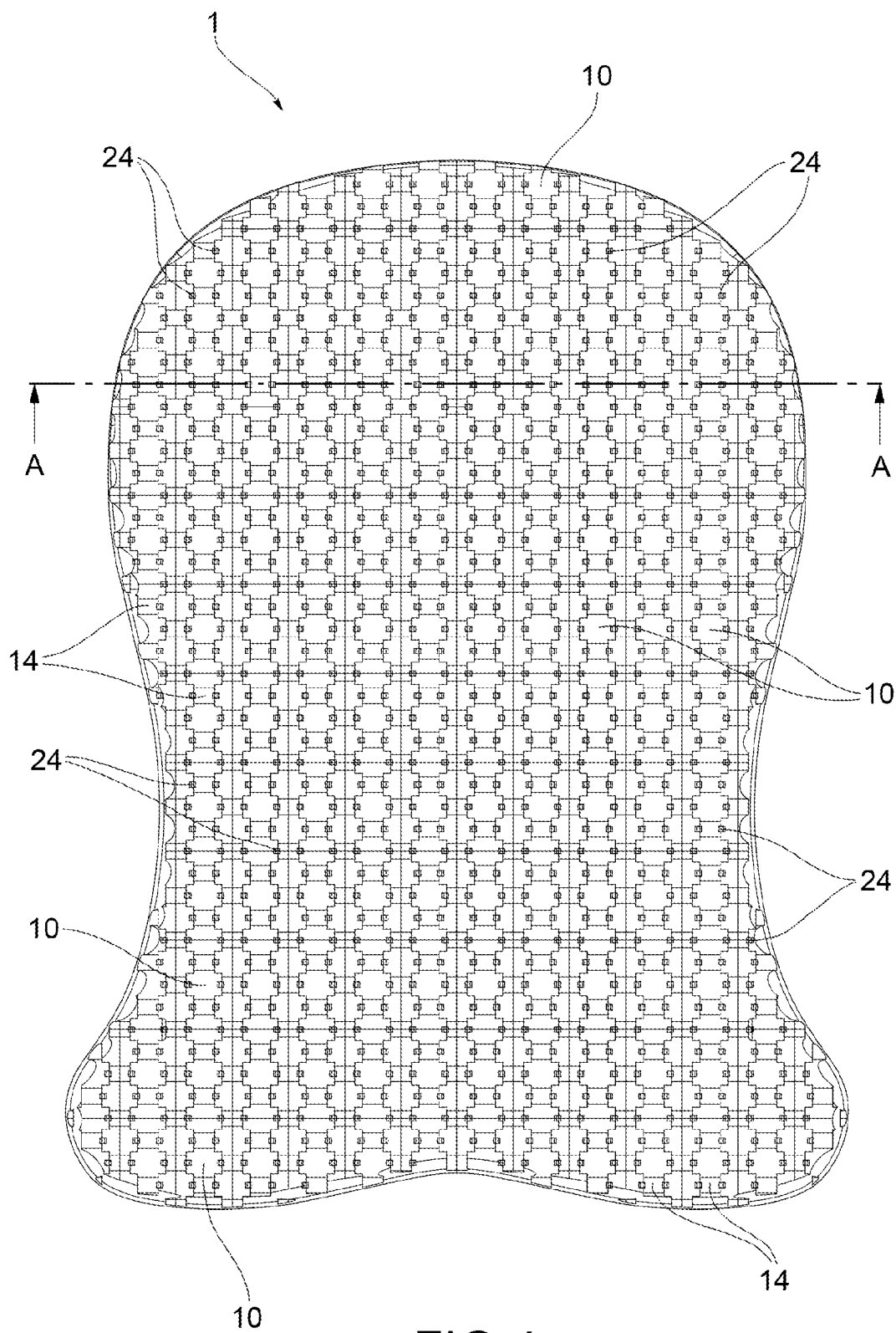
FIG. 4 is a plan bottom view of the mat.
Figure 5:
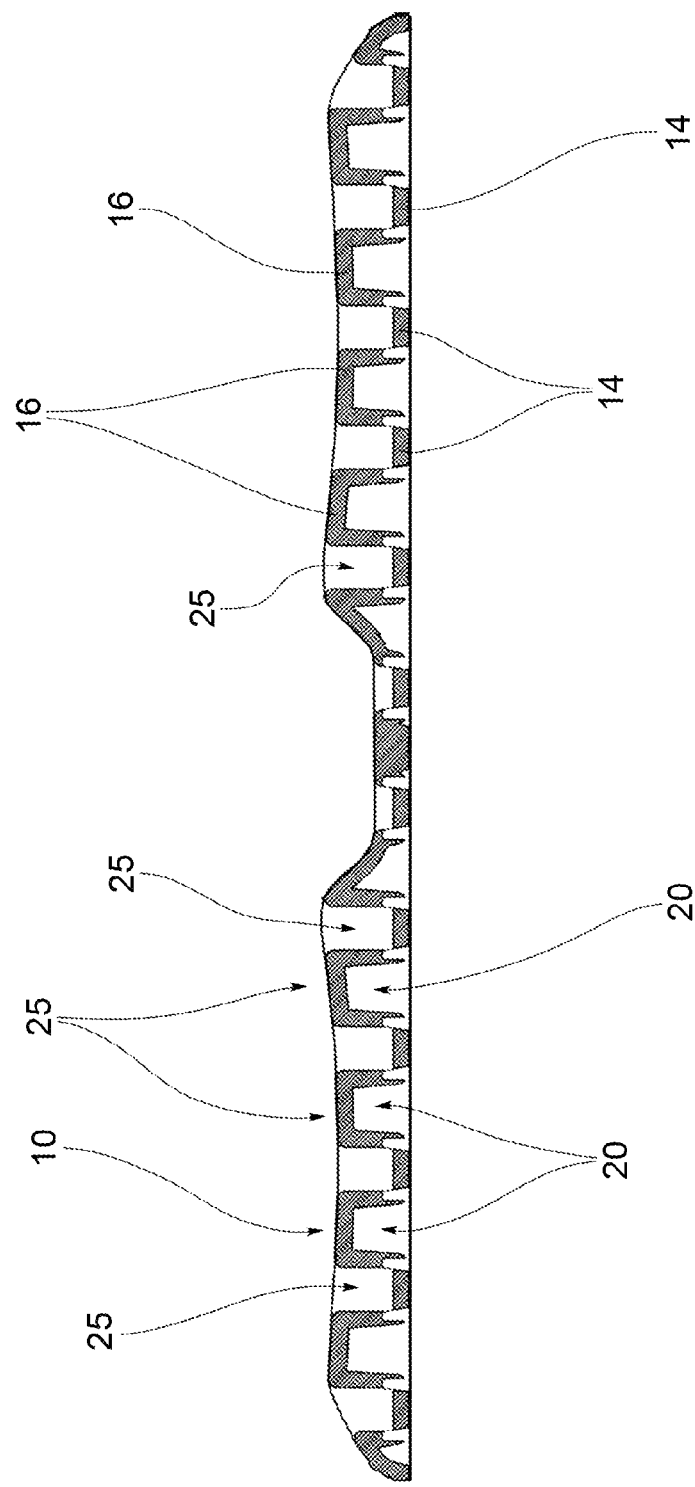
FIG. 5 is a cross section of the mat along line A-A in FIG. 4.

In particular, in the case of bumps 10 of rectangular cross-section, end portions of the sides of adjacent bumps 10 are superposed and integral with each other, as can be seen in particular from the plan view of the mat in FIG. 3.

In this way, thickening areas, therefore of greater resistance to deformation along planes in which the vent openings 24 lie, are formed in the mat so as to prevent them from being completely occluded by the collapse of the bumps 10.

Also to further increase this effect of less deformation of the side walls 18 in which the vent openings 24 are formed, in an embodiment in which the bumps 10 have a substantially rectangular cross-section, the vent openings 24 are formed only at the shorter opposite sides of the side wall 18.

It should be noted that the height and/or the shape of the top wall 16 of the bumps 10 can be selected as desired and be different even in the same cushioning mat 1. For example, height and/or shape may vary depending on the load to which the cushioning mat is subjected or depending on the different thickness that the mat must assume in some areas with respect to others.

For example, the saddle pad shown in the accompanying drawings has a thickness increasing towards one end, given by a progressive increase in the height of the cushioning mats 10.

In one embodiment, the cushioning mat 1 is made integrally in a single body of a thermoplastic material. Therefore, whether it is obtained by injection moulding or by casting, the cushioning mat 1 is made in a single operation and does not require any assembly of several parts or subsequent processing.

A man skilled in the art may make several changes, adjustments, adaptations and replacements of elements with other functionally equivalent ones to the embodiments of the cushioning mat according to the invention in order to meet incidental needs, without departing from the scope of the following claims. Each of the features described as belonging to a possible embodiment can be obtained independently of the other embodiments described.

The invention claimed is:

1. A cushioning mat made of a thermoplastic material by injection moulding, comprising: a unibody having a plurality of cushioning bumps arranged in a plurality of rows, each row having the bumps alternating with substantially flat bottom portions, each bump comprising a top wall and a side wall extending from a mat base identified by said bottom portions, said top wall and said side wall defining an inner bump cavity, the bumps of adjacent rows being staggered with each other, the top walls of the bumps forming a yielding support surface for a user, wherein in at least a portion of each side wall a vent opening is made as a through opening which places in communication the inner bump cavity with the outside of the bump to provide air circulation, wherein the bumps of adjacent rows are at least partially superposed with each other at least along vertical planes which the vent openings lie on, and wherein superposition of corresponding portions of the bumps is present in an undeformed configuration, wherein each vent opening leads into a vent chamber that is completely open upwards from the flat bottom portion, inferiorly delimited by the bottom portion and laterally delimited by the side walls of the bumps adjacent to said bottom portion and wherein each of the plurality of cushioning bumps is fluidly connected with at least one vent chamber via the vent opening so that air flows between each of the plurality of cushioning bumps and a corresponding vent chamber independently from air flow between other cushioning bumps and their corresponding vent chambers.

2. The mat according to claim 1, wherein the vent opening is made astride or near the connecting edge of each bump with at least one of the adjacent bottom portions.

3. The ma according to claim 1, wherein each bump is connected to the nearest bumps of adjacent rows by means of respective portions of side wall.

4. The mat according to claim 1, wherein at least some of the cushioning bumps have the top wall substantially flat or convex.

5. The mat according to claim 1, wherein at least some of the cushioning bumps have a substantially rectangular cross section.

6. The mat according to claim 5, wherein a bump is connected to the bumps of the adjacent rows at the edges of the side wall.

7. The mat according to claim 1, wherein the bumps have side and top walls of substantially constant thickness.

8. The mat according to claim 1, wherein the mean height of the inner bump cavity is greater than the thickness of the top wall.

9. The mat according to claim 1, wherein the transverse extension of the inner bump cavity is greater than the thickness of the side wall.

10. The mat according to claim 1, wherein the edges delimiting the vent openings are spaced from connection areas between the bumps of adjacent rows.

11. The mat according to claim 1, wherein the bumps have a substantially rectangular cross section, and where the vent openings are made only at opposite shorter sides of the side wall.

12. A saddle pad for horse riding, comprising a unibody cushioning mat made of a thermoplastic material by injection moulding, the unibody cushioning mat having a plurality of cushioning bumps arranged in a plurality of rows, each row having the bumps alternating with substantially flat bottom portions, each bump comprising a top wall and a side wall extending from a mat base identified by said bottom portions, said top wall and said side wall defining an inner bump cavity, the bumps of adjacent rows being staggered with each other, the top walls of the bumps forming a yielding support surface for a user, wherein in at least a portion of each side wall a vent opening is made as a through opening which places in communication the inner bump cavity with the outside of the bump to provide air circulation, wherein the bumps of adjacent rows are at least partially superposed with each other at least along vertical planes which the vent openings lie on, and wherein superposition of corresponding portions of the bumps is present in an undeformed configuration, wherein each vent opening leads into a vent chamber that is completely open upwards from the flat bottom portion, inferiorly delimited by the bottom portion and laterally delimited by the side walls of the bumps adjacent to said bottom portion and wherein each of the plurality of cushioning bumps is fluidly connected with at least one vent chamber via the vent opening so that air flows between each of the plurality of cushioning bumps and a corresponding vent chamber independently from air flow between other cushioning bumps and their corresponding vent chambers.

13. The saddle pad according to claim 12, wherein the height and/or the shape of the top wall of the bump varies in order to give the mat a different softness and/or a different thickness in some parts from others.

\* \* \* \* \*